June 30, 1942.    C. L. TOWNSEND    2,288,375
FREQUENCY MODULATION
Filed July 19, 1940
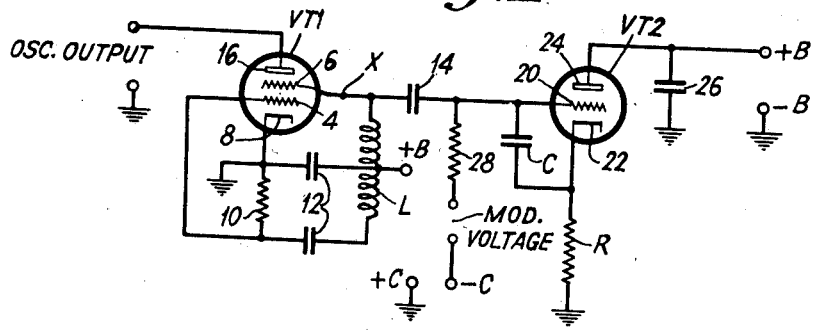
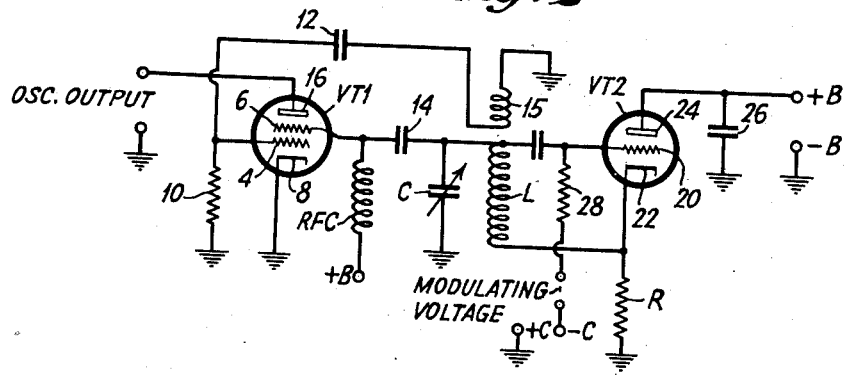
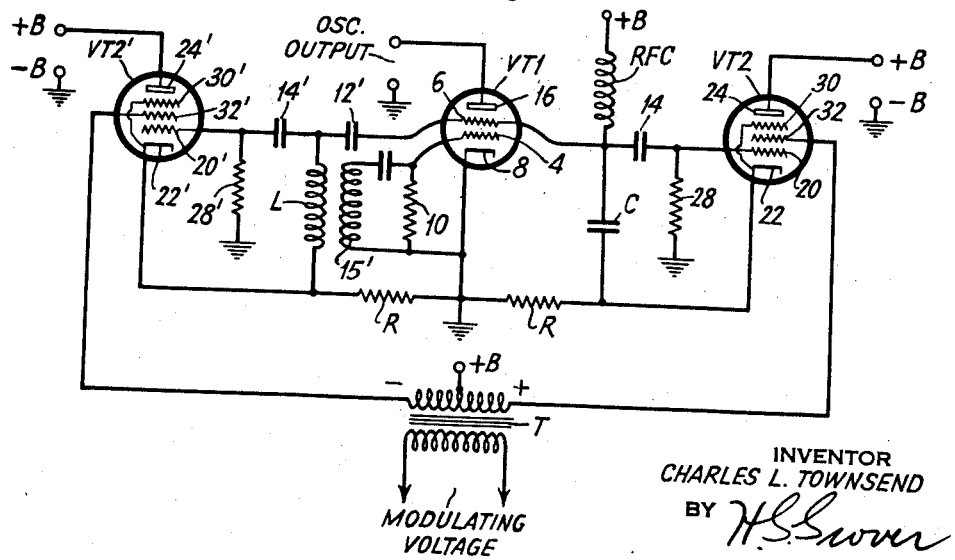
INVENTOR
CHARLES L. TOWNSEND
BY
ATTORNEY Patented June 30, 1942

2,288,375

UNITED STATES PATENT OFFICE 2,288,375

FREQUENCY MODULATION

Charles L. Townsend, Bronxville, N. Y., assignor to Radio Corporation of America, a corporation of Delaware Application July 19, 1940, Serial No. 346,309

9 Claims. (Cl. 179—171.5)

This application concerns a new and improved method of and means for modulating the frequency of oscillatory energy in accordance with control potentials. In the method and means of the application an electron-coupled oscillator has its frequency of operation controlled in accordance with changes in the modulating voltage. Other types of oscillators may be used.

Various schemes for frequency modulation are known in the art today. For example, by the addition of two alternating voltages which are displaced in phase relation by a substantially fixed amount, phase modulation can be produced when the relative amplitudes of the voltages added are varied.

Correction of the modulation and multiplication of the deviation thereof results in frequency modulation. Crosby, in his United States application No. 136,578 filed April 13, 1937, shows a frequency modulator wherein a reactance tube is used to control the frequency of an oscillation generator, the reactance tube being controlled by modulating potentials to thereby modulate the frequency of the oscillator in accordance with modulating potentials. In the scheme such as disclosed in Crosby's above referred to application, the plate circuit of a vacuum tube can be made to exhibit either inductive or capacitive reactance depending upon the phase angle of the voltage applied to its grid. The amount of this apparent reactance and, consequently, the resonant frequency of the circuit of which it is a part, is a function of the mutual conductance of the reactance tube which can be modulated in many ways, several of which are disclosed in the said Crosby application and in other Crosby applications.

Another form of tube modulation involves changes in grid-to-filament capacity which results from the feeding back from the plate of the tube in question to its grid out-of-phase current, through a condenser from grid to plate. Examples of this form of variable condenser for use in modulation has been disclosed in Rothe 2,088,439 patented April 27, 1939.

My novel method and means for modulating the frequency of operation by varying the reactance in the oscillator circuit by the use of a tube and a reactance is not to be confused with the tube modulators described above.

The systems outlined above have several qualities which, it is believed, can be improved on by my present method and means. The number of frequency doublers necessary in the phase modulation and frequency multiplier type of modulation system can be reduced. The instability sometimes associated with the other two systems is greatly reduced by my method and means.

In describing my invention, reference will be made to the attached drawing wherein:

Fig. 1 shows an electron-coupled tube oscillator, the oscillation generating circuits of which includes a condenser the effective capacity of which is controlled by an electron discharge tube conductance, the said tube conductance, in turn, being controlled by modulating voltage.

Fig. 2 is similar in many respects to the modification shown in Fig. 1 but in Fig. 2 an inductance replaces the capacity of Fig. 1.

Fig. 3 illustrates a balanced type of modulator wherein the oscillation generating circuits include an inductive reactance the effective value of which is controlled by a modulator tube and a capacity reactance the effective value of which is controlled by a second modulator tube both modulator tubes being controlled as to conductivity by modulating potentials.

In Fig. 1, an electron discharge tube VT1 has its control grid 4 and its screen grid 6 with its cathode 8 connected in an oscillation generating circuit comprising a grid leak resistance 10, blocking and coupling condensers 12, inductance L, condenser C, and blocking condenser 14. The manner in which this oscillator operates, it is believed, is well known in the art and further discussion thereof is believed unnecessary.

The anode 16 thereof is electronically coupled to the oscillation generating circuits and electrodes and provides the output means for the system.

The condenser C is connected between the grid 20 and cathode 22 of tube VT2 and this connection is extended to ground through the resistance R. A positive direct-current potential is supplied to the anode 24 and the anode is bypassed for radio frequencies by condenser 26. Modulating potentials are supplied by way of a resistance 28 between the grid and cathode of the tube VT2.

The object of the circuit illustrated in Fig. 1 is to provide a method and means by which the frequency of the oscillations developed in the tube VT1 and the circuit comprising elements L and C can be varied in accordance with changes in a voltage supplied at the terminals marked "Modulation Input."

This frequency variation is the result of changes in the effective capacity of the condenser C, which is included in the oscillation generating circuits and the changes in the capacity of condenser C are caused in the following manner.

The charge which condenser C assumes is a function of, among other things, the voltage appearing across it. Through the action of tube VT2 when connected as shown, a voltage is generated across resistance R which is function of, and in some degree in phase with, the voltage appearing across C and R in series due to the oscillator VT1. The effective voltage applied to condenser C is the oscillator voltage appearing between point X and ground minus that portion of the voltages across R which are in phase with the voltage at X.

More in detail, when VT2 conducts, a voltage is produced across R which is due to the plate-to-cathode current in VT2, which current is in phase with the potential difference between grid and cathode. This grid to cathode voltage will lag the voltage at X by an amount determined by the relative impedances of C and R. If the impedance of R is kept small in proportion to that of C, a relatively large part of the voltage across R due to the action of VT2 will be in phase with the voltage at X. Since this voltage across R is applied to the terminal of C opposite to that at which the voltage at X is applied, the effective drop across C is reduced by the action of VT2.

The voltage drop in R is variable and is varied as a function of the modulating voltage by varying the conductance of VT2. Since the magnitude of this voltage across R is a function of the mutual conductance of VT2, the effective capacity of C and hence the frequency of the combination of L and C are also functions of the mutual conductance of tube VT2. In the diagram control of the mutual conductance and of tube VT2 is obtained by voltages applied at the terminals marked "Modulation Input".

With this arrangement the capacity into which the oscillator anode circuit (here an electron-coupled oscillator is used and the screen grid is acting as an anode of the oscillator) looks or which is reflected into the oscillator circuit is the effective capacity of C. When the tube VT2 is non-conductive this effective capacity is maximum and can be relatively large depending on the oscillator frequency.

When the tube VT2's mutual conductance is raised by grid bias or the modulating potentials, the effective capacity of C is lower (because the voltage across R increases and that across C goes down) and the effective capacity into which the oscillator plate circuit is looking is lower.

Obviously since the frequency of operation of tube VT1 is determined in part by its reactance circuits, the frequency of operation thereof can be controlled and if the control potential is characteristic of voice or television signals, the frequency modulation of the oscillations will correspond to said signals.

A feature of my method and system is that the upper capacity limit is determined by condenser C and occurs when the tube VT2 is non-conductive. In known arrangements the upper capacity limit occurs when the tube conductivity is greatest. Obviously this limit is not fixed as definitely as is the upper limit in my arrangement. The lower capacity range is limited in my system only by the extent to which the conductivity of the tube can be raised. In other arrangements the lower limit is determined by other values of the circuit elements.

In Fig. 2, the oscillation generator is quite similar to that shown in Fig. 1 and the elements therein have been designated by reference numerals and letters corresponding to those used in Fig. 1, where the same correspond. In Fig. 2, a separate inductance 15 coupled to inductance L is included in the grid-to-cathode circuit. Moreover, in Fig. 2, the reactance which is controlled by modulating potentials is the inductance L and not the capacity C, as in Fig. 1.

The operation of the arrangement of Fig. 2, in general, is similar to operation of the modification shown in Fig. 1. However, in Fig. 2, the inductance L and the resistor R are in the oscillator radio-frequency current path and the voltage across L is leading the current whereas in Fig. 1 the voltage across C is lagging the current. Now, the ability of inductance L to take this lagging current is a function in part at least of the voltage across L. Consequently, when the tube VT2's conductance is low, the voltage across L is high, and its effective inductance is low and as the tube VT2 becomes more conductive, the voltage across L becomes lower and its effective inductance increases. The voltage across L is a resultant of the voltage produced by the oscillating current across L and R minus the voltage in R caused by the plate-to-cathode current in tube VT2.

In the arrangement of Fig. 3, I vary both the effective inductance L and the effective capacity C simultaneously and in a sense to add in respect to the effect on the frequency of the oscillations generated. In the modification of Fig. 3, reference numerals and letters applied to the oscillator tube VT1 and its circuits correspond insofar as possible to the reference numerals applied to the oscillator in the preceding figures. In Fig. 3, the generation circuits include grid 6 serving as an anode, coupling condenser 12', inductance L coupled to inductance 15' connected to grid 4, and condenser C. The modulator tube VT2 controls the effective capacitive effect of condenser C, while the tube VT2' controls the inductive effect of inductance L. L and C are in the frequency determining circuits of the oscillation generator. The circuits of tubes VT2 and VT2' are similar to the circuits of tubes VT2 of Figs. 1 and 2, respectively, in many respects, and it is thought a description of the same in detail here would be mere repetition. In Fig. 3, tubes VT2 and VT2' are of the multi-grid type with the suppressor grids 30' and 30 connected to the cathodes 22 and 22' and the screening electrodes 32 and 32' connected in phase opposition with the secondary winding of transformer T. In Figs. 1 and 2, modulation is applied to the control grid 20, not to the screen grids 30 and 30', as in Fig. 3.

In Fig. 3, the maximum capacity of C occurs when the tube VT2 is non-conductive just as it does in the arrangement of Fig. 1. In Fig. 3, the effective inductance of L is minimum when the tube VT2' is non-conductive just as it occurred in the corresponding arrangement of Fig. 2. Now, in Fig. 3, the conductances of tubes VT2 and VT2' are modulated differentially so that the capacity C decreases when the inductance of L decreases, and vice versa. Thus, the differentially modulated tube conductances operate together to increase and decrease the frequency of operation of the oscillator in accordance with the modulating potentials.

My novel method and means has several advantages, several of which have been discussed above. Additional advantages are as follows:

Firstly, very large changes in frequency can be obtained without the use of doublers, since in practice, capacity or inductance changes as great as ten to one have been obtained. Consequently, the modulator may be applied to an oscillator working at the carrier frequency desired.

Secondly, since the capacity being controlled is large in comparison to that of the tube used to control it, the inescapable changes in tube parameters, which are usually so detrimental to circuit stability, are reduced to a negligible amount. This has in fact permitted the construction of modulated oscillators of extremely constant frequency when this method of modulation is combined with construction principles known to the art, which, in themselves, tend to produce a stable unmodulated oscillator.

What is claimed is:

1. A controllable reactance including, an electron discharge device having a grid, an anode, and a cathode, a reactance connected in an alternating current path between said grid and cathode, a resistance connected between said anode and cathode, means for applying alternating current in shunt to said reactance and resistance in series whereby alternating current flows in said resistance and reactance and alternating current relayed by said tube flows in said resistance, and a voltage the value of which varies with variations in the alternating current flowing in said reactance is developed across said reactance and a reactive effect of a value which varies with said voltage variations is produced across said reactance.

2. A controllable capacitive reactance including, an electron discharge device having a grid, a cathode and an anode, a condenser connected in an alternating current path between said grid and cathode, a resistance connected between said anode and cathode, means for applying alternating current in shunt in said resistance and condenser in series whereby alternating current flows in said resistance and condenser and alternating current relayed by said tube flows in said resistance, and a voltage the value of which varies with variations in the alternating current flowing in said resistance is developed across said condenser and a capacitive effect of a value which varies with said voltage variations is produced across said condenser.

3. A controllable inductance including, an electron discharge device having a grid, an anode, and a cathode, an inductance connected in an alternating current path between said grid and cathode, a resistance connected between said anode and cathode, means for applying alternating current in shunt to said inductance and resistance in series whereby alternating current flows in said inductance and condenser and alternating current relayed in said tube flows in said resistance, and a voltage the value of which varies with variations of the alternating current flowing in said resistance is developed across said inductance and an inductive effect the value of which varies with said voltage variations is produced across said inductance.

4. In a wave length modulation system, a circuit comprising a reactance and a resistance in series, means for causing alternating current the wave length of which is to be modulated to flow in said circuit, an electron discharge device having a control grid, an anode, and a cathode, means for including the control grid and cathode of said device in a circuit with said reactance, means for including the anode and cathode of said device in a circuit with said resistance, and means for varying the conductivity of said device in accordance with control potentials to thereby vary the effective reactance of said reactance and thereby vary the wave length of the current flowing in said first circuit.

5. In a wave length modulation system, a circuit comprising a reactance and a resistance in series, connections for causing alternating current the wave length of which is to be modulated to flow in said circuit, an electron discharge device having a control grid, an anode and a cathode, connections between the control grid and cathode of said device and the terminals of said reactance, connections connecting the anode to cathode impedance of said device and said resistance in an alternating current circuit, and a control circuit for varying the conductivity of said device in accordance with control potentials to vary the current in said resistance to vary the voltage across said reactance and thereby vary the wave length of the current flowing in said first circuit.

6. In a wave length modulation system, an electron discharge device having a grid, an anode and a cathode, an inductance connected between said grid and cathode, a resistance connected in an alternating current path between said anode and cathode, a circuit wherein alternating current the wave length of which is to be modulated flows, coupled with said inductance and resistance to cause alternating current to flow in said inductance and resistance and to impress alternating current on said grid and cathode so that alternating current relayed by said tube also flows in said resistance and a controllable voltage is provided across said inductance and a controllable inductive effect is produced in said circuit, and a modulation circuit for controlling the conductance of said device in accordance with modulating potentials.

7. In a wave length modulation system, an electron discharge device having a grid, a cathode and an anode, a condenser connected between said grid and cathode, a resistance coupled in an alternating current path between said anode and cathode, a circuit wherein alternating current the wave length is to be modulated flows connected with said resistance and condenser to cause alternating current to flow in said resistance and condenser and to impress alternating current on said control grid and cathode so that alternating current relayed by said tube also flows in said resistance and a controllable voltage is provided across said inductance and a capacitive effect is produced in said circuit, and a modulation circuit for controlling the conductance of said device in accordance with modulating potentials.

8. In a wave length modulation system, a first circuit comprising a condenser and a resistance, a second circuit comprising an inductance and a second resistance, means for causing wave energy the wave length of which is to be modulated to flow in said circuits, a first electron discharge device having input electrodes and output electrodes, means coupling said input electrodes to said condenser, means coupling said output electrodes to said resistance, a second electron discharge device having input and output electrodes, means coupling the input electrodes of said second electron discharge device to said inductance, means coupling the output electrodes of said second discharge device to said second resistance, and means for modulating the conductivity of said devices at signal frequency.

9. In a wave length modulation system, a first circuit comprising a condenser and a first resistance in series, a second circuit comprising an inductance and a second resistance in series, means for causing wave energy the wave length of which is to be modulated to flow in said circuits, a first electron discharge device having input electrodes and output electrodes, means coupling said input electrodes in shunt to said condenser, means coupling said output electrodes in shunt to said first resistance, a second electron discharge device having input and output electrodes, means coupling the input electrodes of said second electron discharge device in shunt to said inductance, means coupling the output electrodes of said second discharge device in shunt to said second resistance, and means for modulating the conductivity of said devices in opposition at signal frequency.

CHARLES L. TOWNSEND.